United States Patent
Xu et al.

(10) Patent No.: US 6,633,439 B1
(45) Date of Patent: Oct. 14, 2003

(54) OPTICAL RECORDING SYSTEM WITH ASPHERICAL SOLID IMMERSION LENS

(75) Inventors: Baoxi Xu, Singapore (SG); Minyu Liu, Singapore (SG); Tow Chong Chong, Singapore (SG); Gaoqiang Yuan, Singapore (SG)

(73) Assignee: Data Storage Institute, Singapore (SG)

( * ) Notice: Subject to any disclaimer, the term of this patent is extended or adjusted under 35 U.S.C. 154(b) by 301 days.

(21) Appl. No.: 09/714,007

(22) Filed: Nov. 16, 2000

(30) Foreign Application Priority Data

Jan. 7, 2000 (SG) .......................... 200000010

(51) Int. Cl.⁷ ................ G02B 13/18; G02B 13/00; G11B 7/00; H01J 5/16
(52) U.S. Cl. ................ 359/719; 359/708; 359/717; 359/642; 359/819; 369/44.23; 369/44.15; 369/112.01; 369/112.24; 250/216; 250/234; 250/227.11
(58) Field of Search .................. 359/664, 719, 359/712, 708, 717, 718, 728, 819, 811, 642; 369/44.28, 44.23, 44.14, 44.15, 112.24, 112.01, 112.08, 118; 250/216, 227.11, 234

(56) References Cited

U.S. PATENT DOCUMENTS

| | | | | |
|---|---|---|---|---|
| 5,497,359 A | * | 3/1996 | Mamin et al. | 369/44.15 |
| 5,729,393 A | * | 3/1998 | Lee et al. | 359/819 |
| 5,917,788 A | * | 6/1999 | Mowry | 369/44.23 |
| 5,939,709 A | * | 8/1999 | Ghislain et al. | 250/216 |
| 6,005,834 A | * | 12/1999 | Maeda et al. | 369/44.23 |
| 6,023,378 A | * | 2/2000 | Schaenzer | 359/819 |
| 6,157,598 A | * | 12/2000 | Mowry | 369/44.23 |
| 6,226,238 B1 | | 5/2001 | Kasono | |
| 6,236,513 B1 | * | 5/2001 | Mallary | 359/642 |
| 6,442,110 B1 | * | 8/2002 | Yamamoto et al. | 369/44.23 |

FOREIGN PATENT DOCUMENTS

| | | |
|---|---|---|
| JP | 08 212579 A | 8/1996 |
| JP | 11 213419 A | 8/1999 |
| JP | 11 288523 A | 10/1999 |

* cited by examiner

Primary Examiner—Loha Ben
(74) Attorney, Agent, or Firm—Perkins Coie LLP

(57) ABSTRACT

The present invention provides an improved optical reading and recording system utilizing optical system employing an aspherical solid immersion lens (SIL). The improved optical system has an aspherical SIL between an objective lens and the recording media. The aspherical SIL reduces the focused electromagnetic radiation beam spot size by providing an increased numeric aperture (NA) of the optical system. The aspherical surface of the SIL provide greater manufacturing and operating tolerances between the objective lens and the aspherical SIL. Greater manufacturing tolerances provide an easier to manufacture optical system. Increased ease of manufacture reduces the cost of optical systems.

30 Claims, 6 Drawing Sheets

OPTICAL RECORDING SYSTEM WITH ASPHERICAL SOLID IMMERSION LENS

This invention relates generally to an optical recording system and more particularly to an optical recording system employing a solid immersion lens having an aspherical surface that tends to increase the optical system tolerance.

BACKGROUND

Optical data storage systems are of great commercial and academic interest due to their potential for very high data density storage. Unlike magnetic recording, where data density may be limited by particle size, the density of optical recording is limited by the size of the laser beam spot. Any technological improvement that tends to decreases the size of the laser beam spot may be used in a optical recording system to increase the data density.

According to the diffraction theory, when a laser is focused by a lens, the minimum laser beam spot size is the diffraction limit of the lens. The diffraction limit of the lens is proportional to the laser wavelength and inversely proportional to the numerical aperture (NA) of the lens. Decreasing the wavelength of the laser theoretically will decrease the diffraction limit and thus tend to result in a smaller laser beam spot size.

Another prior art method of reducing the laser spot size is to increase the NA of the lens. As will be appreciated, solid immersion lenses (SILs) can possess a very high NA. An optical system employing SIL could greatly increase NA and therefore greatly increase optical recording density. An optical system employing SIL also includes an objective lens for focusing the laser beam on the SIL.

SILs have a curved surface and a flat surface. The curved surface of the SILs are typically partial-sphere shapes such as a partial hemisphere less than half a sphere; or, a hemisphere exactly one half of a sphere; or, a truncated sphere more than a hemisphere, also known as a super-hemisphere. U.S. Pat. No. 5,881,042, by Knight (Knight) is one example utilizing spherical SILs. Knight is hereby incorporated by reference herein for all purposes.

In an SIL with a spherical curved surface, the assembly tolerance is severely limited due to rapidly increasing aberration when the lens position deviates from ideal position, especially in the optical axis direction. To control these tolerances, the objective lens and the SIL are rigidly mounted in an assembly which assures the distance between the objective lens and the spherical SIL remains constant. This results in a reading and recording head that is difficult and expensive to manufacture and heavier than ideal.

SUMMARY OF THE INVENTION

The present invention provides an improved optical reading and recording system employing an aspherical solid immersion lens (SIL). The improved optical system has an aspherical SIL between an objective lens and the recording media. The aspherical SIL reduces the focused electromagnetic radiation beam spot size by providing an increased numeric aperture (NA) of the optical system. The aspherical surface of the SIL reduces aberrations thereby providing greater manufacturing and operating tolerances. Greater manufacturing tolerances provide an easier to manufacture optical system. Increased ease of manufacture reduces the cost of optical systems.

According to the present invention, the objective lens and the aspherical SIL are no longer required to be rigidly mounted in one assembly as in the prior art. Utilizing an aspherical SIL allows the objective lens to be mounted in the arm and the aspherical SIL to be mounted in a separate, lighter weight, air bearing slider operating very near the recording media. A lighter weight, air bearing slider requires a reduced air bearing to operate.

DESCRIPTION OF THE PREFERRED EMBODIMENTS

Figure 1A:
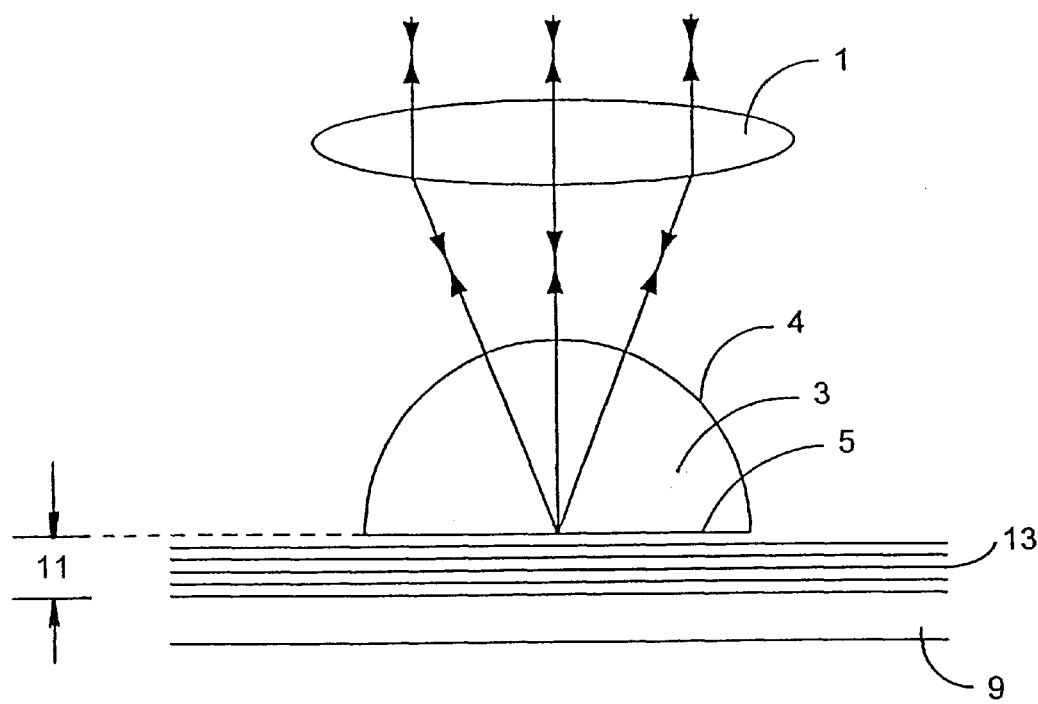
FIG. 1A illustrates an optical recording system having of an objective lens and a solid immersion lens with an aspherical surface.
Figure 1B:
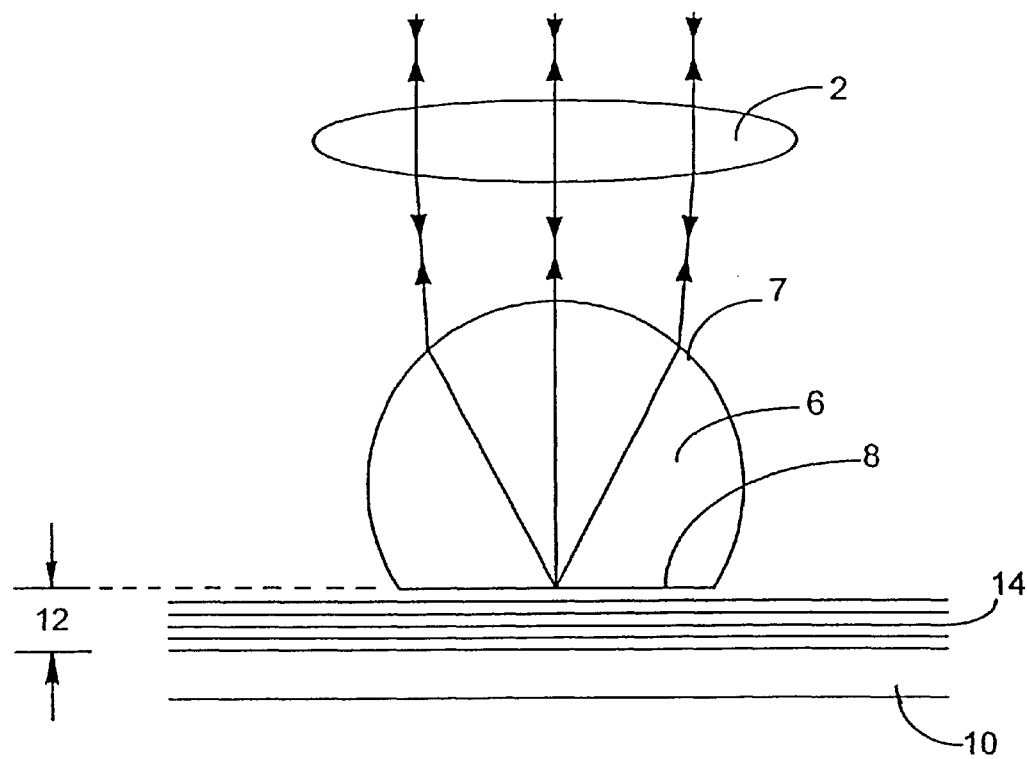
FIG. 1B illustrates an optical recording system consisting of an objective lens and a super-solid immersion lens with an aspherical surface.

FIG. 1A illustrates an optical system including an aspherical solid immersion tens (SIL) in accordance with one embodiment of the present invention. FIG. 1B illustrates an optical system including an aspherical super-solid immersion lens (SSIL) in accordance with one embodiment of the present invention. FIGS. 1A and 1B are described simultaneously as appropriate.

As will be appreciated by those skilled in the art, an aspherical solid immersion lens (SIL) is a solid lens with a curved, non-spherical surface and a flat surface. In comparison, a spherical SIL is a solid lens with a curved surface with a constant radius and a flat surface. A hemispherical SIL is a spherical SIL where the flat surface is exactly two radii in width. A super-hemispherical SIL resembles a truncated sphere greater than a hemispherical SIL, where the flat surface is less than two radii in width. Those skilled in the art will also understand the practical implications of the following theoretical discussion With reference to FIGS. 1(A) and 1(B) respectively, electromagnetic radiation from an electromagnetic radiation source such as a light source or a laser is focused by an objective lens 1, 2 and a solid immersion lens 3, 6 onto a media 9, 10. Reflected and diffracted electromagnetic radiation from the media 9, 10 is detected by electromagnetic radiation detectors (not shown) such as a photo-detector. When information is being written on the media 9, 10, the electromagnetic radiation source is modulated at high power. The modulated, high power electromagnetic radiation irradiates the media 9, 10. When the information is being read from the media 9, 10, a low power continuous wave electromagnetic radiation illuminates the media 9, 10. The reflected and diffracted electromagnetic radiation from the media 9, 10 is detected by an electromagnetic radiation detector.

As one skilled in the art would appreciate, the media 9, 10 whether rewritable, recordable, or read only optical media may be read utilizing the present invention. Utilizing the present invention to write or record information on the media 9, 10, depends upon the specific type of media 9, 10. The present invention can also be utilized in combination with other well known components such as an electromagnetic writing coil.

In accordance with one embodiment of the present invention, the SIL has an aspherical surface 4, 7 facing the objective lens 1, 2 and a flat surface 5, 8 facing the media 9, 10. The distance 11, 12 between the top surface of the media 9, 10 and the flat surface of the SIL 5, 8 is preferably less than one hundred nanometers. Constituent material 13, 14 is located between the flat surface of the SIL 5, 8 and the media 9, 10. The constituent material 13, 14 preferably shares an equivalent index of refraction n with the SIL and are considered as part of SIL.

Figure 2A:
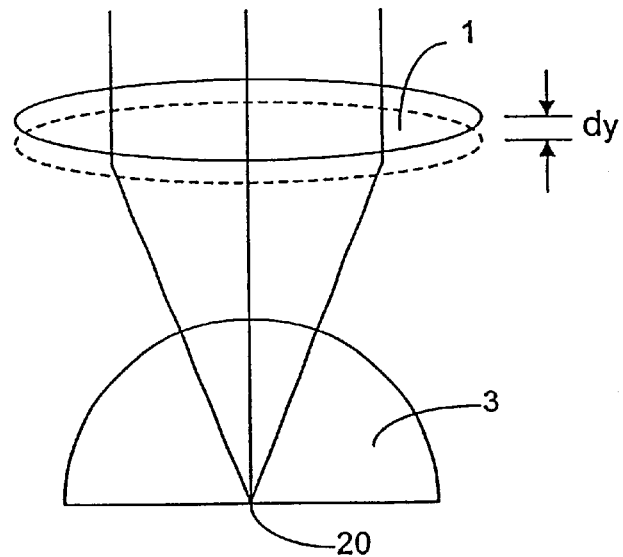
FIG. 2A illustrates the relative position of the objective lens and a solid immersion lens.

FIG. 2A illustrates the relative positions of the objective lens 1 and the solid immersion lens 3, in accordance with one embodiment of the present invention. The light is forwarded on a focal point 20 by objective lens 1, the focal point 20 of the objective lens 1 being at the curvature center of the pole part of SIL 3.

Figure 2B:
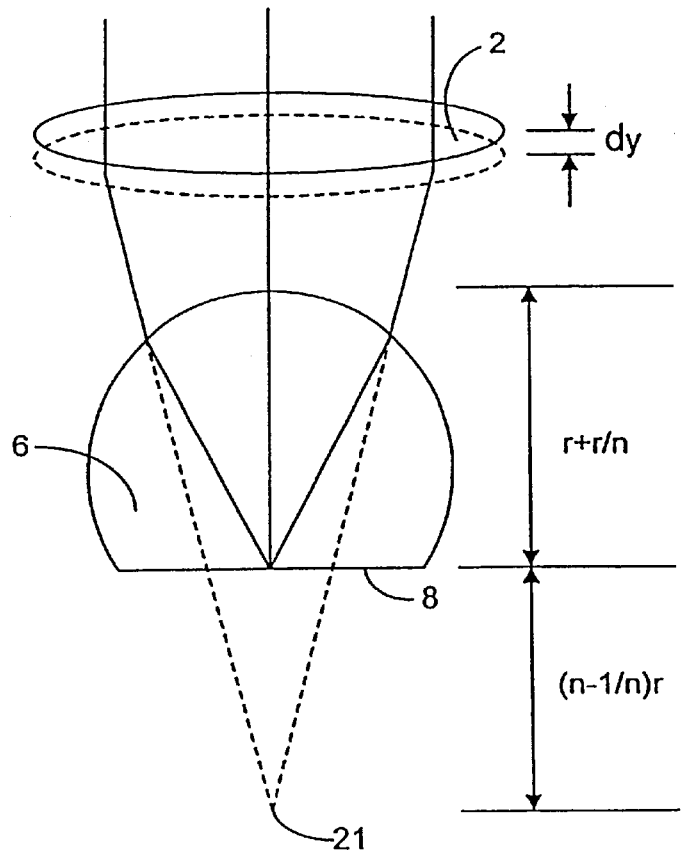
FIG. 2B illustrates the relative position of the objective lens and a super-solid immersion lens.

FIG. 2B illustrates the relative positions of the objective lens 2 and the super-solid immersion lens 6, in accordance with one embodiment of the present invention. The light is focused on a focal point 21 by objective lens 2, with the optical system utilizing an objective lens 2 and a super-solid immersion lens 6. Focal point 21 of objective lens 2 is at (n−1/n)r below the flat surface 8 of super-solid immersion lens 6.

A suitable formula for expressing an aspherical surface is:

$$z = \frac{cx^2}{1 + \sqrt{1 - (1+k)c^2x^2}} + Ax^4 + Bx^6 + Cx^8 + Dx_o^{10}.$$

In this equation, "z" is the sag of the surface parallel to the y axis, "c" is the curvature at the pole of the surface, "k" is the conic coefficient. "A," "B," "C," "D" are the 4th, 6th, 8th, and 10th order deformation coefficients, respectively.

TABLE 1

Aspherical surface parameters for solid immersion lens

| Lens No. | K | A | B | C | D |
|---|---|---|---|---|---|
| 31a | −0.073503 | −0.00403026 | 0.226207 | −1.5356 | 3.94669 |
| 32a | −0.081156 | −0.00542 | 0.2659 | −1.81179 | 4.65731 |
| 33a | −0.084389 | −0.0067065 | 0.293426 | −2.0 | 5.12858 |
| 34a | −0.081413 | −0.00195713 | 0.210662 | −1.42661 | 3.6929 |
| 35a | −0.077746 | 0.000548846 | 0.161355 | −1.07828 | 2.79763 |
| 36a | −0.121386 | −0.00896402 | 0.41 | −2.7984 | 7.18388 |

Figure 3A:
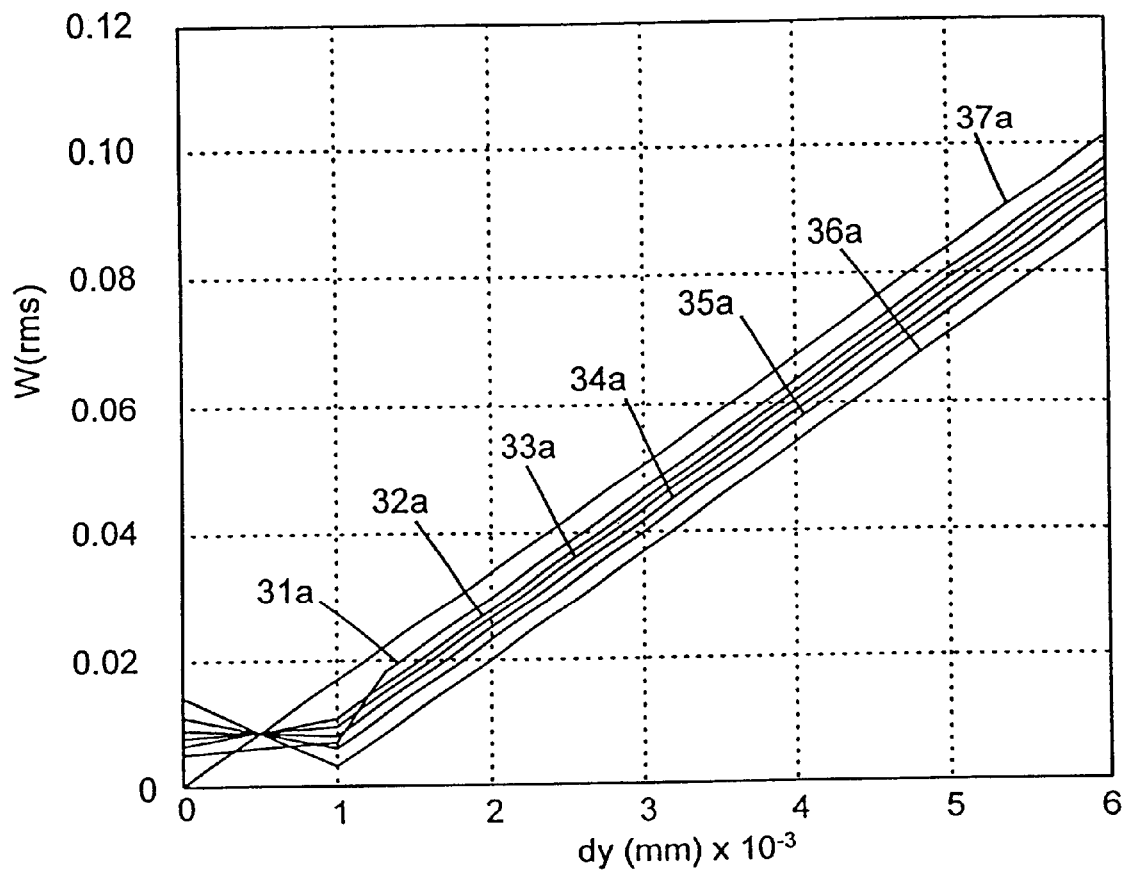
FIG. 3A illustrates the relationship between wavefront aberration and position deviation for a solid immersion lens.
Figure 3B:
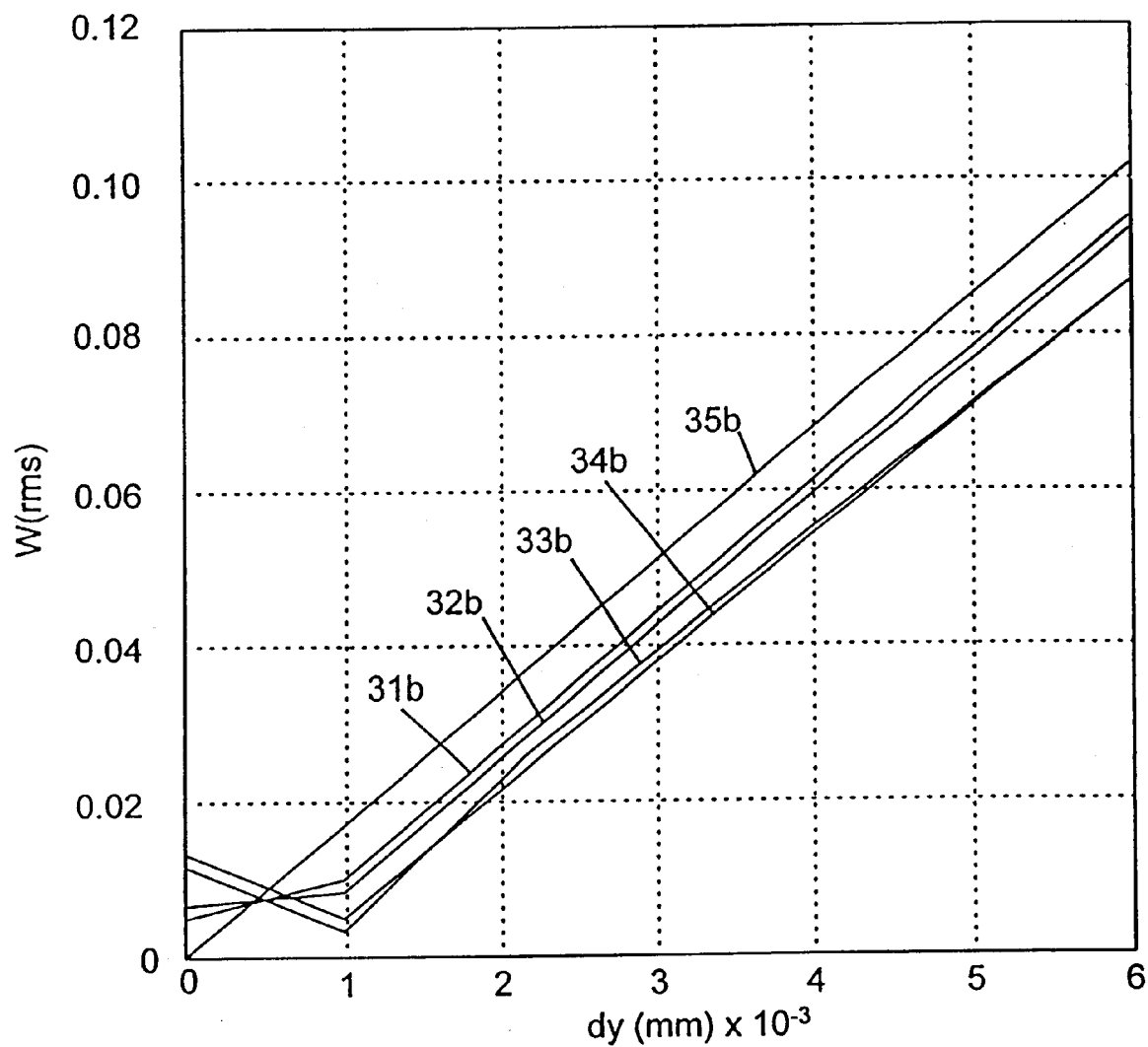
FIG. 3B illustrates the relationship between wavefront aberration and position deviation for a super-solid immersion lens.

Above Table 1 lists the parameters of a selection of aspherical SILs 31a–36a. The aberrations of aspherical SILs 31a–36a are illustrated in FIG. 3A. Table 2 lists the parameters of a selection of aspherical SSILs 31b–34b. The aberrations of aspherical SSILs 31b–34b are illustrated in FIG. 3B. In these examples, the numerical aperture of the objective lens=0.4, refractive index (n) of the SIL and SSIL=1.83 and r=1 millimeter.

FIG. 3A and FIG. 3B illustrate the tolerance advantages of various aspherical SILs over spherical SILs. Referring first to FIG. 3A, curves 31a through 36a represent the aberration for each of the corresponding aspherical SILs 31a–36a described in Table 1. Curve 37a represents the aberration for a spherical SIL which is not listed in Table 1.

In one example, if the critical wavefront aberration W is defined as 0.015 rms, then the corresponding tolerance for spherical SIL 37a is 0.0009 mm. Contrasting to the aspherical SILs 35a, 36a the corresponding tolerance are 0.0015 mm and 0.0017 mm respectively. The corresponding tolerances provided by aspherical SILs 31a–34a are also illustrated in FIG. 3A. Aspherical SIL 36a provides nearly twice the tolerance over the spherical SIL 37a, 0.0017 mm versus 0.0009 mm. One skilled in the art can appreciate the clear advantage of the increased tolerance provided by the aspherical SIL over the spherical SIL.

In another example, if the critical wavefront aberration W is defined as 0.010 rms, then the corresponding tolerance for spherical SIL 37a is 0.0005 mm, and aspherical SILs 31a–35a are suitable for use in such an application. SIL 6a is not suitable for use in this application because the aberration of SIL 6a is larger than 0.01 rms at dy=0.

Referring next to FIG. 3B, curves 31b through 34b represent the aberration for each of the corresponding aspherical super solid immersion lenses (SSILs) 31b through 34b described in Table 2. Curve 35b represents the aberration for a spherical SSIL, which is not listed in Table 2.

In one example, if the critical wavefront aberration W is defined as 0.015 rms, then the corresponding tolerance (dy) for spherical SSIL 35b is 0.0009 mm. Contrasting to the aspherical SSIL 33b, 34b the corresponding tolerance are 0.0016 mm and 0.0016 mm respectively. The corresponding tolerances provided by aspherical SSILs 1b, 2b are also illustrated in FIG. 3B. Aspherical SSILs 33b, 34b provide substantially increased tolerance over the spherical SSIL 35b, 0.0016 mm versus 0.0009 mm. One skilled in the art can appreciate the clear advantage of the increased tolerance provided by the aspherical SSIL over the spherical SSIL.

TABLE 2

Aspherical surface parameters for super solid immersion lens

| Lens No. | K | A | B | C | D |
|---|---|---|---|---|---|
| 31b | −0.001361 | −0.00481637 | 0.0392665 | −0.077322 | 0.057546 |
| 32b | −0.001508 | −0.00618335 | 0.0423884 | −0.08028 | 0.589106 |
| 33b | −0.000169 | −0.00319578 | 0.010553 | −0.0148438 | 0.00779814 |
| 34b | −0.001404 | −0.00760953 | 0.0398503 | −0.0697267 | 0.0488919 |

Figure 4:
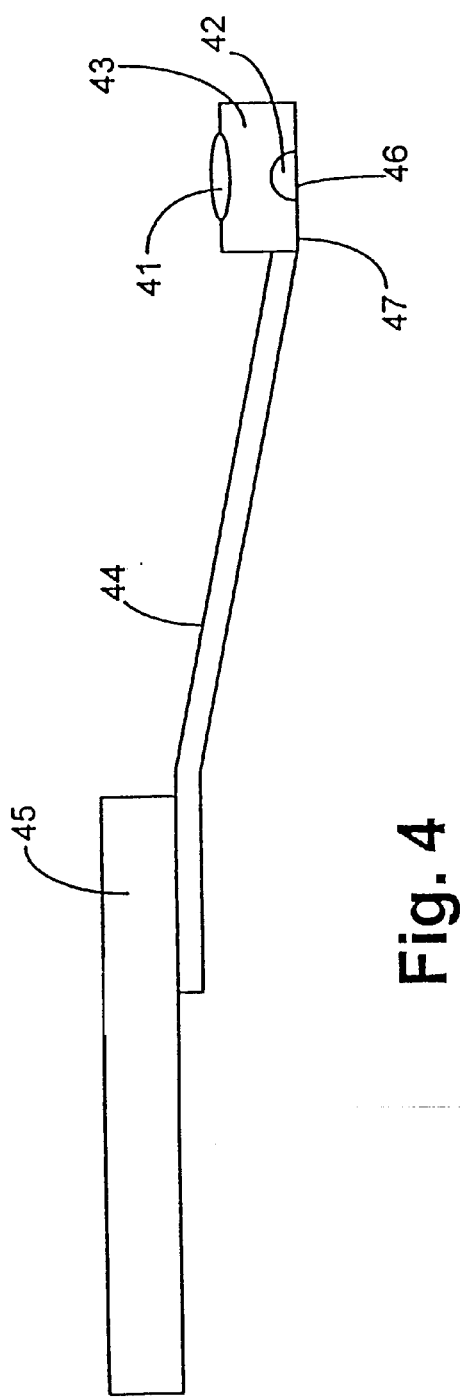
FIG. 4 illustrates an optical head in which objective lens and solid immersion lens or super-solid immersion lens are mounted together on a slider.

FIG. 4 illustrates one embodiment in accordance with the present invention. Objective lens 41 and solid immersion lens 42 with aspherical surface are mounted together onto an air bearing slider 43 suspended by a suspension 44 from arm 45. The flat surface 46 of the SIL 42 is substantially aligned with the lower surface 47 of the air bearing slider 43. The large tolerance provided by the aspherical SIL, decreases assembly labor and time and therefore reduces the production costs. SIL 42 can be an aspherical solid immersion lens or an aspherical super-solid immersion lens.

Figure 5:
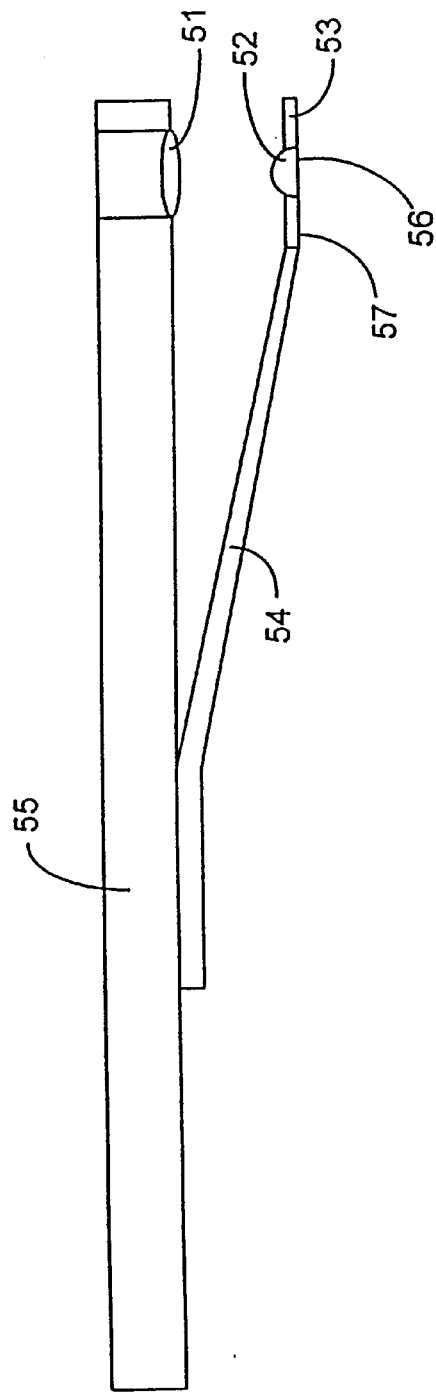
FIG. 5 illustrates an optical head in which objective lens is mounted on an arm and a solid immersion lens or super-solid immersion lens is mounted on a slider.

FIG. 5 illustrates another embodiment in accordance with the present invention. The objective lens 51 is mounted on a fixed arm 55 and the SIL 52 is mounted on a separate, air bearing slider 53 suspended by suspension 54. The flat surface 56 of the SIL 52 is substantially aligned with the lower surface 57 of the air bearing slider 53. In this embodiment, the SIL 52 is capable of moving independent of the objective lens 51. This embodiment is made possible by the improved features of the aspherical solid immersion lens. SIL 52 can be an aspherical solid immersion lens or an aspherical super-solid immersion lens. Separating SIL 52 from the objective lens 51 and mounting the SIL 52 on the air bearing slider 53 results in a lighter weight air bearing slider 53.

Figure 6A:
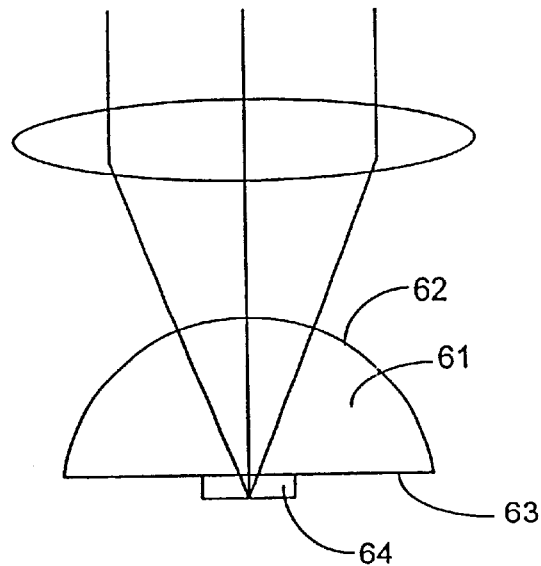
FIG. 6A illustrates the solid immersion lens with a portion of the flat surface removed, leaving the centrally located portion.

FIG. 6A illustrates an aspherical solid immersion lens 61 in accordance with one embodiment of the present invention. The aspherical solid immersion lens 61 includes an aspherical surface 62 and a flat surface 63. A portion of the flat surface 63 has been removed. A centrally located portion 64 remains. The centrally located portion 64 may be employed to serve as the lower section of aspherical solid immersion lens 61. The centrally located portion 64 allows for the removal of part of the aspherical solid immersion lens 61. As the refracted electromagnetic radiation does not extensively use the lower periphery of the aspherical solid immersion lens 61, there is less need for the lower periphery of the aspherical solid immersion lens 61. By removing the portion of the flat surface 63, more room can be gained for the placement of an electromagnetic writing coil (not shown) and the weight of the aspherical solid immersion lens 61 can be reduced.

The centrally located portion 64 can be grown using known techniques onto aspherical solid immersion lens 61. Alternatively, the area around centrally located portion 64 can be etched or mechanically removed. The centrally located portion 64 can be integral and constituted of the same material as aspherical solid immersion lens 61.

Figure 6B:
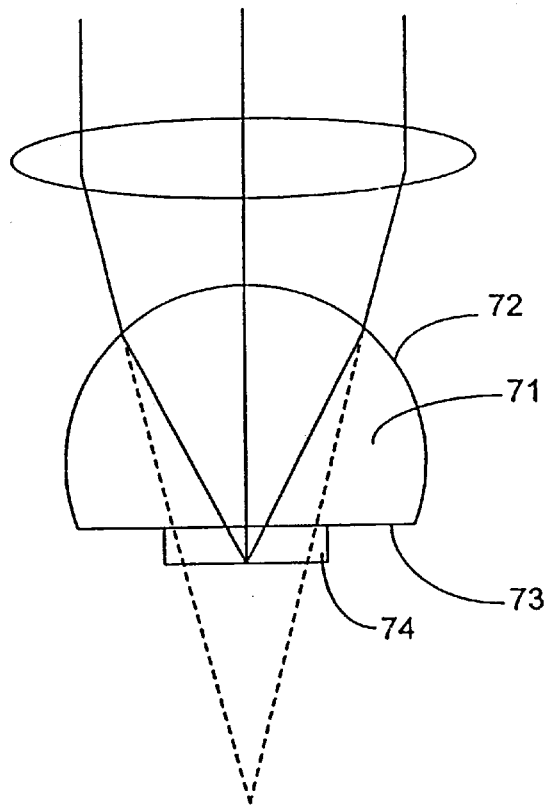
FIG. 6B illustrates the super-solid immersion lens with a portion of the flat surface removed, leaving the centrally located portion.

FIG. 6B illustrates an aspherical super-solid immersion lens 71 in accordance with one embodiment of the present invention. The aspherical super-solid immersion lens 71 includes an aspherical surface 72 and a flat surface 73. A portion of the flat surface 73 has been removed. A centrally located portion 74 remains. The centrally located portion 74 may be employed to serve as the lower section of aspherical super-solid immersion lens 71. The centrally located portion 74 allows for the removal of part of the aspherical super-solid immersion lens 71. As the refracted electromagnetic radiation does not extensively use the lower periphery of the aspherical super-solid immersion lens 71, there is less need for the lower periphery of the aspherical super-solid immersion lens 71. By removing the portion of the flat surface 73, more room can be gained for the placement of an electromagnetic writing coil (not shown) and the weight of the aspherical super-solid immersion lens 71 can be reduced.

The centrally located portion 74 can be grown using known techniques onto aspherical super-solid immersion lens 71. Alternatively, the area around centrally located portion 74 can be etched or mechanically removed. The centrally located portion 74 can be integral and constituted of the same material as aspherical super-solid immersion lens 71.

Data may be written to a magneto-optical disk by also employing a separate magnetic field. In another embodiment of the invention, a magnetic coil is employed to create a magnetic field for interaction with the optical recording medium. This coil can be co-axial with the SIL 61, 71. In this embodiment, the strongest point of the vertical magnetic field can be nearly coincident with the focused beam on the recording media. Like the SIL 61, 71, this coil can be integrated into the body of the air bearing slider 43, 53.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. An optical data storage system capable of reading and recording data to and from an optical recording media, the optical data storage system comprising:
    an air bearing slider, and
    a read/write head,
    wherein the read/write head includes:
        i) a solid immersion lens having:
            a substantially flat surface;
            an aspherical surface having a radius r along a first optical axis, the aspherical surface formed such that electromagnetic radiation received at the aspherical surface is substantially focused at a point proximal to the substantially flat surface; and
        ii) an objective lens having a second optical axis;
            wherein the solid immersion lens is disposed such that the aspherical surface of the solid immersion lens faces the objective lens, the first optical axis and the second optical axis being substantially aligned; and
            wherein the objective lens and the solid immersion lens are mounted on the air-bearing slider.

2. An optical data storage system as recited in claim 1, wherein the solid immersion lens is manufactured from a material having a refractive index n and a thickness of $r+r/n$.

3. An optical data storage system as recited i claim 1, further comprising;
    the solid immersion lens is manufactured from a material having a refractive index n; and
    a constituent material having a refractive index n, the constituent material being disposed between the solid immersion lens and the optical recording media;
    wherein the solid immersion lens and the constituent material have a combined thickness of $r+r/n$.

4. An optical data storage system as recited in claim 1, wherein the solid immersion lens has a thickness of r.

5. An optical data storage system as recited in claim 1, further comprising:
    the solid immersion lens manufactured from a material having a refractive index n; and
    a constituent material having the refractive index n, the constituent material being disposed between the solid immersion lens and the optical recording media;
    wherein the solid immersion lens and the constituent material have a combined thickness of r.

6. An optical data storage system as recited in claim 1, wherein the optical recording media includes a read only media.

7. An optical data storage system as recited in claim 1, wherein the optical recording media includes a phase change rewriteable coating on a substrate which can be glass or aluminum.

8. An optical data storage system as recited in claim 1, wherein the optical recording media includes a magneto-optical rewriteable coating on a substrate which can be glass or aluminum.

9. An optical data storage system as recited in claim 1, wherein r is less than about 2 millimeters.

10. An optical data storage system as recited in claim 1, wherein the substantially flat surface of the solid immersion lens is partially removed leaving only a centrally located portion remaining.

11. An optical data storage system as recited in claim 1, wherein the distance between the substantially flat surface of the solid immersion lens and the optical recording media is less than about 100 nanometers.

12. A method of reading or writing an optical media, comprising the steps of:
providing an optical system including an electromagnetic radiation source, an aspherical solid immersion lens, and an objective lens;
providing an optical recording media; and
focusing electromagnetic radiation on the optical recording media utilizing the optical system;
wherein the objective lens is mounted on an arm and the solid immersion lens is mounted on an air-bearing slider.

13. A method of reading or writing an optical media, as recited in claim 12, wherein the solid immersion lens is manufactured from a material having a refractive index n and a thickness of r+r/n.

14. A method of reading or writing an optical media, as recited in claim 12, wherein:
the solid immersion lens is manufactured from a material having a refractive index n;
a constituent material has the refractive index n, the constituent material being disposed between the solid immersion lens and the optical recording media; and
the solid immersion lens and the constituent material having a combined thickness of r+r/n.

15. A method of reading or writing an optical media, as recited in claim 12, wherein the solid immersion lens has a thickness of r.

16. A method of reading or writing an optical media, as recited in claim 12, wherein:
the solid immersion lens is manufactured from a material having a refractive index n;
a constituent material has the refractive index n, the constituent material being disposed between the solid immersion lens and the optical recording media; and
the solid immersion lens and the constituent material have a combined thickness of r.

17. A method of reading or writing an optical media, as recited in claim 12, wherein the optical recording media includes a read only media.

18. A method of reading or writing an optical media, as recited in claim 12, wherein the optical recording media includes a phase change rewriteable coating on a substrate which can be glass or aluminum.

19. A method of reading or writing an optical media, as recited in claim 12, wherein the optical recording media includes a magneto-optical rewriteable coating on a substrate which can be glass or aluminum.

20. An optical data storage system capable of reading and recording data to and from an optical recording media, the optical data storage system comprising:
an air bearing slider;
an arm; and
a read/write head,
wherein the read/write head includes:
i) a solid immersion lens having:
a substantially flat surface;
an aspherical surface having a radius r along a first optical axis, the aspherical surface formed such that electromagnetic radiation received at the aspherical surface is substantially focused at a point proximal to the substantially flat surface; and
ii) an objective having a second optical axis;
wherein the solid immersion lens is disposed such that the aspherical surface of the solid immersion lens faces the objective lens, the first optical axis and the second optical axis being substantially aligned; and
wherein the objective lens is mounted on the arm and the solid immersion lens is mounted on the air-bearing slider.

21. An optical data storage system as recited in claim 20, wherein the solid immersion lens is manufactured from a material having a refractive index n and a thickness of r+r/n.

22. An optical data storage system as recited in claim 20, wherein:
the solid immersion lens is manufactured from a material having a refractive index n;
a constituent material has the refractive index n, the constituent material being disposed between the solid immersion lens and the optical recording media; and
wherein the solid immersion lens and the constituent material have a combined thickness of r+r/n.

23. An optical data storage system as recited in claim 20, wherein the solid immersion lens has a thickness of r.

24. An optical data storage system as recited in claim 20, wherein:
the solid immersion lens is manufactured from a material having a refractive index n;
a constituent material has the refractive index n, the constituent material being disposed between the solid immersion lens and the optical recording media; and
wherein the solid immersion lens and the constituent material have a combined thickness or r.

25. An optical data storage system as recited in claim 20, wherein the optical recording media includes a read only media.

26. An optical data storage system as recited in claim 20, wherein the optical recording media includes a phase change rewriteable coating on a substrate which can be glass or aluminum.

27. An optical data storage system as recited in claim 20, wherein the optical recording media includes a magneto-optical rewriteable coating on a substrate which can be glass or aluminum.

28. An optical data storage system as recited in claim 20, wherein r is less than about 2 millimeters.

29. An optical data storage system as recited in claim 20, wherein the substantially flat surface of the solid immersion lens is partially removed leaving only a centrally located portion remaining.

30. An optical data storage system as recited in claim 20, wherein the distance between the substantially flat surface of the solid immersion lens and the optical recording media is less than about 100 nanometers.

* * * * *